United States Patent [19]

Dostmann

[11] 4,238,958
[45] Dec. 16, 1980

[54] BAROMETER

[75] Inventor: Heinz Dostmann, Wertheim-Reicholzheim, Fed. Rep. of Germany

[73] Assignee: Dostmann GmbH & Co. KG, Fed. Rep. of Germany

[21] Appl. No.: 81,994

[22] Filed: Oct. 4, 1979

[30] Foreign Application Priority Data

Nov. 28, 1978 [DE] Fed. Rep. of Germany ....... 2851359

[51] Int. Cl.³ .............................................. G01L 7/12
[52] U.S. Cl. ......................................... 73/386; 73/729
[58] Field of Search .................. 73/386, 387, 729, 384

[56] References Cited

U.S. PATENT DOCUMENTS

| | | |
|---|---|---|
| 1,891,134 | 12/1932 | Barthel .................................... 73/729 |
| 2,194,624 | 3/1940 | Titterington ........................... 73/729 |
| 2,235,110 | 3/1941 | Ottley .................................... 73/386 |
| 2,560,237 | 7/1951 | Miller .................................... 73/386 |
| 2,689,480 | 9/1954 | Angst ..................................... 73/387 |
| 2,691,305 | 10/1954 | Frank ..................................... 73/386 |

Primary Examiner—Donald O. Woodiel
Attorney, Agent, or Firm—Sprung, Felfe, Horn, Lynch & Kramer

[57] ABSTRACT

A barometer of the type having a stabilized membrane capsule includes a transmission mechanism for transmitting the motion of the membrane capsule to a pointer mechanism. The transmission comprises a lever shaft with two lever arms thereon, one coupled to the pivotable drive element of the pointer mechanism and the other having a free end abutting directly on the membrane capsule and having an axis which extends obliquely relative to the plane of the membrane capsule.

11 Claims, 5 Drawing Figures

BAROMETER

BACKGROUND OF THE INVENTION

This invention relates to a barometer of the type having a stabilized membrane capsule, a base plate supporting the membrane capsule, a pointer mechanism which is located on one side of the membrane capsule and which includes two substantially parallel plates, in which a pointer shaft is rotatably mounted, and a drive element.

Such a barometer is known and is called an aneroid barometer, the membrane capsule of which consists of two metal membranes joined at the edges in a gas-tight manner and is completely evacuated. A suitable prebiasing of the metal membranes ensures that the metal membranes are not pressed against one another by the ambient air pressure, but are spaced apart to a greater or lesser extent depending on the lever of the air pressure. Such a membrane capsule is designated as a stabilized membrane capsule as compared to unstabilized membrane capsules which are also known and in which the metal membranes are pulled apart by an additional support spring.

Since the one metal membrane is secured to the base plate, the other metal membrane executes an appropriate movement as the air pressure changes. This movement, called excursion, is transmitted by means of a transmission mechanism to a pointer on the pointer shaft whose position can be read off a dial. The transmission mechanism must transform the minute excursions of the membrane capsule into a large pointer movement and, for this purpose, has a large transmission ratio. The transmission mechanism in the known barometer includes a double armed lever which is pivotally articulated on the base plate and which has a long lever arm engaging the second lever arm of the lever shaft which is mounted on the base plate. A chain forming the drive element of the pointer mechanism is positioned about the pointer shaft and is secured or attached to the first lever arm of said lever shaft. The plate of the pointer mechanism which faces toward the membrane capsule includes a member which projects beyond the edge of the plate and which is attached to the base plate by means of a stud bolt.

In a barometer with an unstabilized membrane capsule which is known in the art, the transmission mechanism differs from the structure described hereinbefore in that in place of the pivotal double armed lever, a lever is secured to the support spring which engages the second lever arm of the lever shaft.

In addition to pointer mechanisms featuring a chain or a thread, pointer mechanisms are also known which comprise a pinion on the pointer shaft and a meshing toothed quadrant with which the first pointer arm of the pointer shaft is in engagement.

The drawback of the known barometer is that the transmission mechanism thereof requires considerable expenditure of manufacturing and assembly work and also takes up considerable space. The base plate, for instance, must have a distinctly larger diameter than the membrane capsule to enable the base plate to support the pivotal, double armed lever as well as the lever shaft.

Furthermore, the transmission mechanism, which consists of numerous individual elements, cannot be pre-fabricated as a unit, on the contrary, the pointer mechanism of the elements, the double armed lever and the lever shaft must be separately mounted on the base plate.

Another disadvantage of the known barometer is that, owing to the high frictional resistance in the transmission mechanism, minor variations in air pressure are not automatically indicated. In order to be able to detect minor variations in air pressure by means of this known barometer, one must tap the barometer with one's finger, for instance, thereby subjecting it to vibration and thus overcoming the resistance to movement which prevails at various locations in the transmission mechanism so that, only after such manipulation, will the barometer suddenly be adjusted to the new air pressure value.

SUMMARY OF THE INVENTION

The object of the invention is to design and construct a barometer of the aforementioned type such that the transmission mechanism thereof requires less manufacturing and assembly work. Moreover, the space requirements of the barometer in accordance with the invention should be limited, although the longest possible pointer travel should be ensured for a given excursion of the membrane capsule. Finally, the frictional resistance in the transmission mechanism should be minimized to such an extent that even minor fluctuations in atmospheric pressure will be indicated.

This object is accomplished in accordance with the invention in that the free end of the second lever arm of the lever shaft abuts directly on the membrane capsule and that the axis of the second lever arm extends obliquely relative to the plane of said membrane capsule.

By virtue of the direct abutment of the free end of the second lever arm of the lever shaft on the membrane capsule, the pivotal, double armed lever—or the lever on the support spring of an unstabilized membrane capsule—is dispensible so that the expenditure for its manufacturing and assembly work as well as the space requirements and resistance to movement are eliminated. At the same time, the inclined position of the axis of the second lever arm ensures that the transmission ratio will not be lower in spite of the absence of the double armed lever, since whenever the angle between the axis of the second lever arm and the plane of the membrane capsule—hereinafter designated as the angle of abutment—amounts to 60°, for example, the angle of lever shaft rotation will be twice as great for a given excursion of the membrane capsule as in a parallel arrangement of the second lever arm and membrane capsule plane. In other words, this means that the inclined 60° position achieves the same effect as a double armed lever which has a lever arm ratio of 2:1. The term "axis of the second lever arm" is understood in this context to mean the vertical from the free abutting end thereof relative to the axis of lever shaft rotation.

With a view to the largest possible transmission ratio, an angle of abutment amounting to almost 90° would be expedient. This, however, also entails the danger of jamming. The angle of abutment thus preferably ranges from 40° to 70°, and even more favorably ranges from 45° to 60°.

It can be provided in an advantageous embodiment of the invention that the second lever arm is provided with an external thread and is adjustably screwed into the lever shaft. This facilitates very simple setting and adjustment of the length of the second lever arm and thus of the angle of abutment as well as of the transmission ratio of the transmission mechanism.

Especially favorable transmission ratios result when the course of the first lever arm is adapted to that of the second lever arm such that the axis of the first lever arm forms, relative to the plane of movement of the drive element, an angle which decreases as the angle of abutment decreases. Thus, the decrease in the angle of lever shaft rotation at a given excursion due to a smaller angle of abutment is approximately compensated for by longer travel in the plane of movement of the drive element.

The inventive arrangement of the second lever arm is accomplished especially expediently in that the lever shaft which supports the second lever arm has both ends thereof mounted on the first plate facing the membrane capsule, in particular advantageously in the plane of the plate. This results in an especially compact transmission mechanism which can be prefabricated as a unit and can be secured to the base plate. Since this complete transmission mechanism is positioned on one side of the membrane capsule, the base plate needs to project only slightly beyond the membrane capsule in a radial direction.

The drive element of the pointer mechanism of the inventive barometer can be both a thread or a chain or even a toothed quadrant. If a toothed quadrant is employed, this can be advantageously mounted in both plates of the pointer mechanism so that the existing structural elements are utilized in an optimal manner.

Other advantages and features of the invention will be recited in the dependent claims and the following description of an embodiment with reference to the drawings, in which:

DETAILED DESCRIPTION OF THE INVENTION

Figure 1:
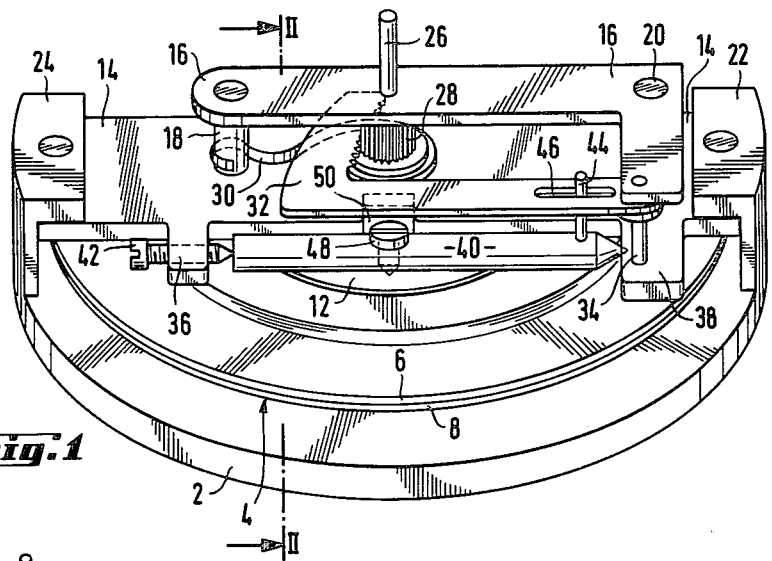
FIG. 1 is a perspective view of an embodiment of a barometer according to the invention.

FIG. 1 depicts a barometer whose casing, face glass, dial and pointers have been omitted. The illustrated barometer includes a circular base plate 2 which concentrically supports a membrane capsule 4 also of circular configuration. The membrane capsule 4 consists of an upper metal membrane 6 shown in FIGS. 1 and 2 as well as a lower metal membrane 8. The metal membranes are joined together at their edges in an air-tight manner and the membrane capsule is evacuated in part. The two metal membranes 6 and 8 are prebiased such that the membrane capsule does not require a support spring to stabilize it, i.e. it is a stabilized capsule.

In the center of the lower metal membrane 8, a threaded stem 10 (see FIG. 2) is attached which is screwed into a threaded hole in the base plate 2 and which has at its free end a slot for engagement with an appropriate tool so that the spacing of the membrane capsule 4 from the base plate 2 can be set or adjusted by turning the threaded stem 10 and thus the membrane capsule 4. A circular abutment plate 12 (see FIG. 2) with a smooth surface is secured in the center of the upper metal membrane 6.

The barometer transmission mechanism is disposed on one side of the membrane capsule 4, viz. on the side of the upper metal membrane 6. The transmission mechanism includes a first plate 14 facing the metal membrane 6 as well as a second plate 16 disposed in spaced relation and parallel to said first plate. Both plates are firmly interconnected by stud bolts 18 and 20. The first plate 14 is secured at the ends thereof to members 22 and 24 of the base plate 2 by means of screws (not shown) in such a way that the base plate supports the entire transmission mechanism in addition to the membrane capsule 4 solely by means of these members.

A pointer shaft 26 is rotatably mounted in both plates 14 and 16. A pinion 28 which alternatively can be integral with the pointer shaft is secured to the pointer shaft 26 between the two plates. The pointer shaft is engaged by a helical spring 30 which is affixed to the stud bolt 18. The pinion 28 meshes with a toothed quadrant 32 which is preferably provided with internal toothing and whose quadrant shaft 34 is rotatably mounted in both plates 14 and 16. Both plates 14 and 16, the stud bolts 18 and 20, the pointer shaft 26, the pinion 28, the helical spring 30 and the toothed quadrant 32 together with its quadrant shaft 34 constitute the pointer mechanism of the illustrated transmission mechanism. A pointer (not shown) can be positioned on the pointer shaft 26.

The first plate 14 has on one of its longitudinal sides two members 36 and 38 in spaced relation to one another. A lever shaft 40 is rotatably mounted on these members such that the lever shaft 40 extends in the plane of the first plate as is revealed in FIGS. 1 and 2. Both bearings of the lever shaft are 40 are designed as toe bearings to enable the shaft to be mounted with as little play as possible. For this purpose, a bearing screw 42 whose free end has a conical configuration and which engages an appropriate hole at one end of the lever shaft 40 is screwed into the member 36. A conical tip is formed at the other end of the lever shaft 40 which, together with a hole in the member 38, forms the other toe bearing.

At the right end in FIG. 1, the lever shaft 40 supports a first lever arm 44 extending through a slot 46 in the toothed quadrant 32 so that by rotating the lever shaft 40 the toothed quadrant 32 is pivoted, thus driving the pointer mechanism. The spacing between the site of engagement between the first lever arm 44 and the toothed quadrant 32 on the one hand and the quadrant shaft 34 of the toothed quadrant 32 on the other hand must be as small as possible compared to the pitch circle radius of the toothed segment 32 so that a large transmission ratio of the transmission mechanism is achieved. In the illustrated embodiment, the first lever arm 44 is designed as a straight pin.

Figure 2:
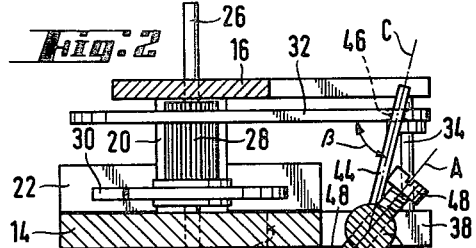
FIG. 2 is an enlarged sectional view showing a portion along line II—II in FIG. 1.

In addition to the first lever arm 44, the lever shaft 40 supports a second lever arm 48 which is designed in the embodiment illustrated in FIGS. 1 and 2 as a cylinder head screw which is screwed into a corresponding threaded hole in the lever shaft 40 and converges to a point at the free end thereof. In order to design the most compact barometer possible, the pointer shaft 26, the membrane capsule 4 and the base plate 2 are arranged concentrically with one another in the illustrated embodiment. The second lever arm 48 is positioned on the lever shaft 40 such that the axis A of the second lever arm 48 forms a right angle relative to the axis of rotation of the lever shaft 40 and is inclined obliquely downwards (in FIG. 2) toward the center of the membrane capsule 4. The free end of the lever arm 48 abuts directly on the abutment plate 12 and axis A forms an angle of abutment α (see FIG. 2) relative to the plane B defined in the illustrated embodiment by the seam between the two metal membranes 6 and 8. An angle β is formed between the axis of the first lever arm 44 and the plane of movement of the toothed quadrant 32 which coincides with the toothed quadrant. FIG. 2 reveals that as the angle of abutment α decreases, angle β also decreases and vice-versa.

A cut-out segment 50 is formed in the first plate 14 adjacent to the second lever arm 48. The free end of the second lever arm 48 can pivot in said cut-out portion so that it is not damaged during assembly.

In the barometer described hereinbefore, the entire transmission mechanism is a compact unit comprising few elements and which is prefabricated in its entirety and can be connected to the base plate 2 and takes up little space. All elements of the transmission mechanism—except for the plates 14 and 16 themselves—are supported by the two plates of the pointer mechanism.

If, for instance, the upper metal membrane 6 is deflected upwardly (in FIG. 2) during a decrease in ambient pressure, this will cause the second lever arm 48 to be pivoted clockwise (in FIG. 2), thereby rotating the lever shaft 40 clockwise and thereby pivoting the first lever arm 44 clockwise as well. Since the angle of abutment α ranges from 40° to 70°, preferably in the range from 45° to 60°, the excursion of the upper metal membrane 6 will cause a relatively large angle of rotation of the lever shaft 40. In any case, this angle of rotation is substantially larger with a given excursion of the upper metal membrane or membrane capsule than if the axis A extended approximately parallel to the plane B. If the angle of abutment α is relatively small in the cited range at low air pressures so that a small angle of rotation is associated with the lever shaft 40 with a given excursion, then the angle β will also be smaller so that again a given angle of rotation of the lever shaft 40 is associated with a long path of movement at the site of engagement between the first lever arm 44 and the toothed quadrant 32. This effects a compensation of the reduction in the transmission ratio by the smaller angle of abutment α. The consequence of the the pivoting of the first lever arm 44, on the other hand, causes the toothed quadrant 32 to be rotated about the quadrant shaft 34 so that the pinion 28 meshing with the toothed segment 32 is rotated, thereby turning the pointer shaft 26 as well.

Figure 4:
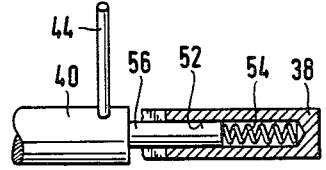
FIG. 4 is a partial illustration of a modification of the embodiment shown in FIGS. 1 and 2.
Figure 3:
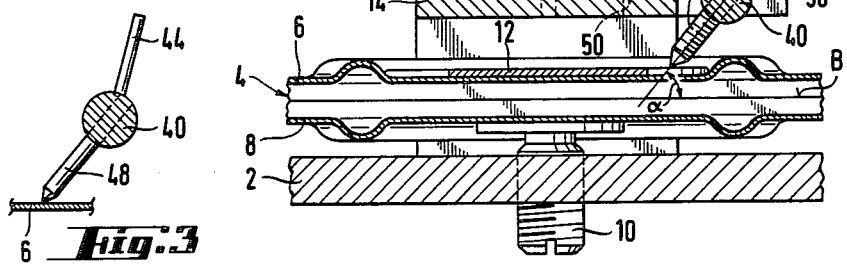
FIG. 3 is an illustration of a modification of one element of the embodiment as shown in FIG. 2.
Figure 5:
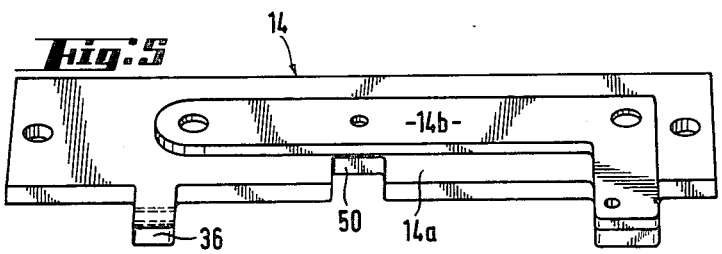
FIG. 5 is a perspective view of a modification of the first plate of the barometer as shown in FIGS. 1 and 2.

Modifications of the embodiment described hereinbefore are shown in FIGS. 3 to 5. FIG. 3, in a view similar to FIG. 2, shows only the lever shaft 40, the first lever arm 44 and the second lever arm 48. In this modification, the second lever arm 48 is not designed as an adjustable screw, but rather as a cylindrical pin with a pointed free end. Again, an important point in this modification is that the second lever arm 48 has its free end in direct abutment on the membrane capsule and that the axis of the second lever arm 48 extends obliquely to the plane of the membrane capsule. FIG. 4 shows a portion of a modification of the right end of the lever shaft 40 (in FIG. 1) together with the associated bearing. This bearing is not designed as a toe bearing in the modification according to FIG. 4. Instead, a cylindrical hole 52 is provided in the member 38. A compression spring 54 is located in hole 52 and a cylindrical extension 56 of the lever shaft 40 is inserted into same. The compression spring 54 is supported at the one end thereof by the extension 56 so that a force directed to the left (in FIG. 4) is exerted on the lever shaft 40. The lever shaft 40 is thus mounted to be axially adjustable, since by adjusting the bearing screw 42, the extension 56 extends to a greater or lesser degree into the hole 52. This adjustment makes it possible to vary the transmission ratio of the transmission mechanism in a simple manner, since the axial displacement of the lever shaft 40 varies the spacing between the site of engagement between the first lever arm 44 and the toothed quadrant 32 on the one hand and the quadrant shaft 34 on the other hand. Finally, FIG. 5 illustrated a modified first plate 14. This modification shows that the first plate 14 does not necessarily have to be integral in construction. On the contrary, it can be constructed of a plurality of elements, e.g. plate elements 14a and 14b, which are firmly interconnected by the stud bolts 18 and 20. In the modification according to FIG. 5, the plate element 14b has the shape of the second plate 16 according to FIG. 1 and the plate element 14a has the shape of the first plate 14 according to FIG. 1. The modified embodiment of the first plate 14 according to FIG. 5 can be advantageous for the manufacturing or production process, for example as far as the construction of the journals bearings for the pointer shaft 26 and the quadrant shaft 34 is concerned.

What is claimed is:

1. A barometer comprising a substantially planer stabilized membrane capsule, a base plate supporting the membrane capsule on one side thereof, pointer drive means disposed on the other side of the membrane capsule and including two substantially parallel plates fixed with respect to the base plates, a pointer shaft rotatably mounted in the two plates and a pivotably mounted drive element engaged with the pointer shaft to rotate same in response to the pivoting movement thereof and transmission means for coupling the membrane capsule to the pointer drive means, the transmission means comprising a rotatable lever shaft, a first lever arm mounted on the lever shaft for rotation therewith and coupled to the drive element to pivot same in response to rotation of the lever shaft and an elongated second lever arm mounted on the lever shaft for rotation therewith and having a free end abutting directly on the membrane capsule to effect rotation of the lever shaft in response to movement of the membrane capsule and wherein the longitudinal axis of the second lever arm extends obliquely relative to the plane of the membrane capsule.

2. A barometer according to claim 1, wherein the membrane capsule and pointer shaft are concentrically disposed and the second lever arm is inclined toward the middle of the membrane capsule.

3. A barometer according to claim 1 or claim 2, wherein the longitudinal axis of the second lever arm forms an angle ranging from 40° to 70° relative to the plane of the membrane capsule.

4. A barometer according to claim 3, wherein the axis of the second lever arm forms an angle ranging from 45° to 60° relative to the plane of the membrane capsule.

5. A barometer according to claim 1, wherein the second lever arm is cylindrical with an external thread and is adjustably screwed into the lever shaft.

6. A barometer according to claim 1, wherein the first lever arm is elongated and the axis thereof forms an angle relative to the plane of movement of the drive element which becomes smaller as the angle between the axis of the second lever arm and the plane of the membrane capsule decreases.

7. A barometer according to claim 1, wherein the parallel plates are parallel to the plane of the membrane capsule and the lever shaft is rotatably mounted at both ends thereof on the one plate closest to the membrane capsule.

8. A barometer according to claim 7, wherein the lever shaft extends in the plane of the one plate.

9. A barometer according to claim 8, further comprising a cut-out segment in the one plate adjacent to the second lever arm.

10. A barometer according to claim 7, further comprising a pinion on the pointer shaft and wherein the drive element is a pivotable toothed quadrant meshing with the pinion on the pointer shaft having a slot therein configured to engage with the first lever arm and means pivotally mounting the toothed quadrant on the two parallel plates.

11. A barometer according to claim 10, further comprising means mounting the lever shaft for be axial adjustment.

* * * * *